United States Patent
Qian et al.

(10) Patent No.: US 9,740,684 B2
(45) Date of Patent: Aug. 22, 2017

(54) DETERMINING HOMONYMS OF LOGOGRAM INPUT

(71) Applicant: LENOVO (Singapore) PTE, LTD., New Tech Park (SG)

(72) Inventors: Ming Qian, Cary, NC (US); Qigang Wang, Beijing (CN); Song Wang, Cary, NC (US); Jianbang Zhang, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 20 days.

(21) Appl. No.: 14/625,425

(22) Filed: Feb. 18, 2015

(65) Prior Publication Data
US 2016/0239484 A1    Aug. 18, 2016

(51) Int. Cl.
G06F 17/28    (2006.01)
G06F 17/27    (2006.01)
G06F 17/22    (2006.01)

(52) U.S. Cl.
CPC ...... *G06F 17/2795* (2013.01); *G06F 17/2223* (2013.01)

(58) Field of Classification Search
CPC .............. G06F 17/276; G06F 17/2863; G06F 17/3053; G06F 17/3064; G06F 17/30646; G06F 17/2223; G06F 3/018; G06F 3/0237; G06K 9/00402; G06K 9/00436
USPC ...... 704/2, 276, 270, 260, 270.1; 379/88.03; 341/22, 28; 382/189, 192
See application file for complete search history.

(56) References Cited

U.S. PATENT DOCUMENTS

| | | | | |
|---|---|---|---|---|
| 5,187,480 A | * | 2/1993 | Thomas | G06F 3/018 341/22 |
| 6,292,768 B1 | * | 9/2001 | Chan | G06Q 40/02 704/1 |
| 7,505,911 B2 | * | 3/2009 | Roth | G10L 15/22 379/88.03 |
| 9,256,592 B1 | * | 2/2016 | Shanmugasundaram | G06F 17/273 |
| 2004/0193592 A1 | * | 9/2004 | Ozaki | G06F 17/30796 |
| 2015/0319510 A1 | * | 11/2015 | Ould Dellahy, VIII | H04N 21/234 725/32 |

* cited by examiner

*Primary Examiner* — Charlotte M Baker
(74) *Attorney, Agent, or Firm* — Kunzler Law Group (57) ABSTRACT

For determining homonyms of logogram input, code may recognize a logogram from at least part of a written logogram drawn by a user or a typed logogram. In addition, the code may determine whether homonyms of the logogram are to be made available to the user. The code also may determine multiple logograms having a pronunciation that matches the pronunciation of the logogram if the homonyms of the logogram are to be made available to the user. The code may provide a hint list to the user that contains the multiple logograms to enable selection of a logogram from the hint list. The code may also rank the multiple logograms based on context.

20 Claims, 6 Drawing Sheets

DETERMINING HOMONYMS OF LOGOGRAM INPUT

BACKGROUND

Field

The subject matter disclosed herein relates to logogram input and more particularly relates to determining homonyms of logogram input.

Description of the Related Art

Entering logograms, such as Chinese characters, certain Japanese characters (e.g., Kanji), certain Korean characters (e.g., Hanja), and the like, may be difficult because of the complexity of certain logograms and because of the large number of logograms.

BRIEF SUMMARY

An apparatus for determining homonyms of logogram input is disclosed. The apparatus includes a processor and a memory. The memory may store code executable by the processor. The code recognizes a logogram from at least part of a written logogram drawn by a user or a typed logogram. In addition, the code determines whether homonyms of the logogram are to be made available to the user. The code also determines multiple logograms having a pronunciation that matches the pronunciation of the logogram if the homonyms of the logogram are to be made available to the user. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
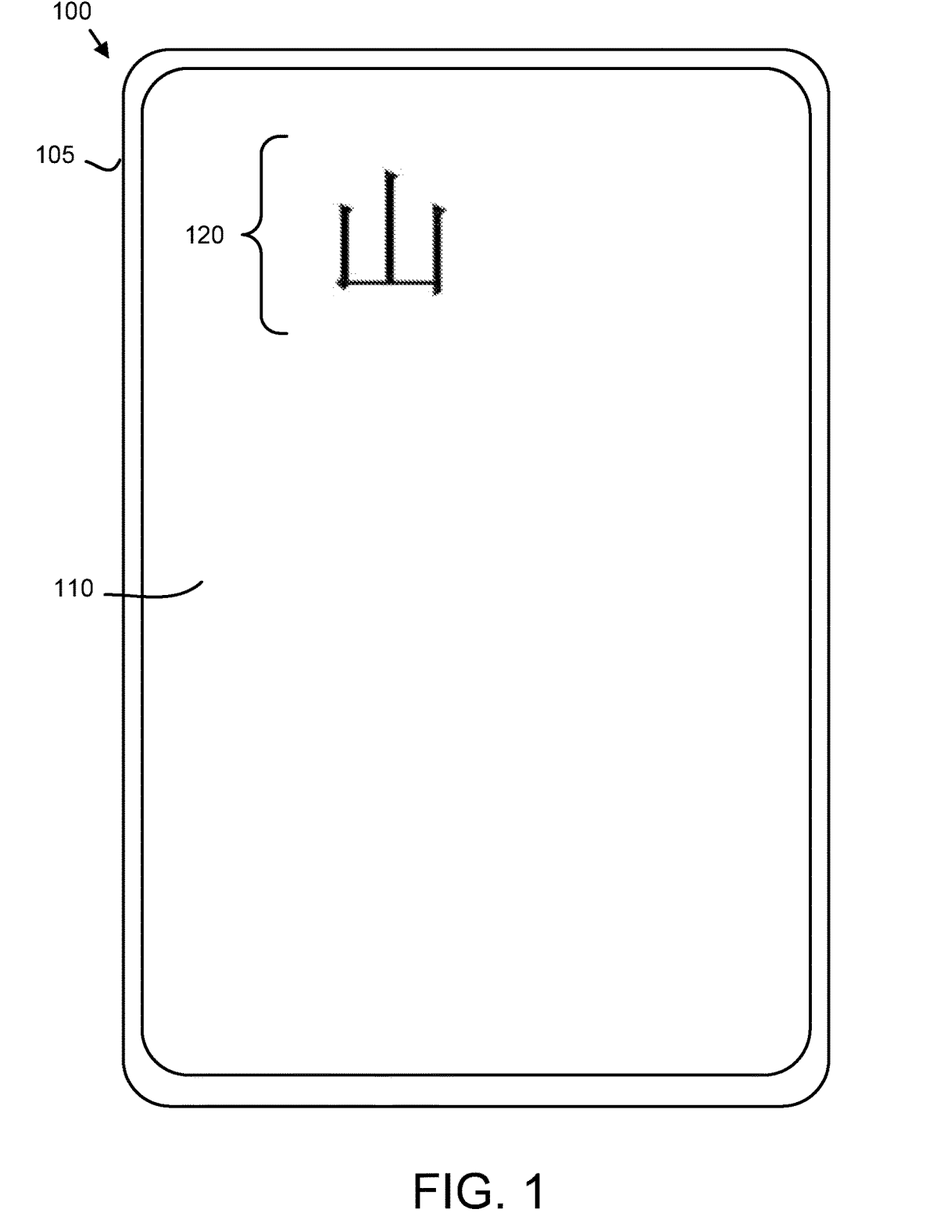
FIG. 1 is a drawing illustrating one embodiment of an electronic device.

FIG. 1 is a drawing illustrating one embodiment of an electronic device 100. In the depicted embodiment, the electronic device 100 is a tablet computer. Alternatively, the electronic device 100 may be a mobile telephone, a laptop computer, a computer workstation, or the like. In one embodiment, the electronic device 100 includes a graphical input 105 and display 110.

The graphical input 105 is depicted as accepting logogram input 120. The logogram input 120 may be a handwritten logogram or a portion of a handwritten logogram drawn by a user. In certain embodiments, the logogram input 120 may be a logogram typed by the user. In the depicted embodiment, the logogram input 120 is incorrect for the desired logograms that a user wishes to enter into the electronic device 100. The logogram input 120 is a homonym of the desired Chinese logogram "擅." In some embodiments, the user may draw or type a logogram that the user remembers to have the same pronunciation as the desired logogram (e.g., a homonym). This may be because of the complexity of certain logograms, the number of possible logograms, and/or the memory of the user. For example, the user may remember a simple logogram (e.g., "山") that is a homonym of the desired logogram (e.g., "羴"). Accordingly, the user may draw or type the simple logogram.

In the past, when a user incorrectly entered logogram input 120, the user might eventually find the desired logogram. However, the user was often still uncertain what logogram input 120 should have been entered into the electronic device 105 in order to generate the desired logogram. The embodiments described herein determine whether homonyms of the logogram input 120 are to be made available to the user. If homonyms of the logogram input 120 are to be made available to the user, multiple logograms having a pronunciation that matches the logogram that is recognized from the logogram input 120 are determined. In addition, the embodiments may display the multiple logograms that are homonyms of the logogram input 120 to enable the user to select a desired logogram. As a result, the user may draw the logogram input 120 to find the desired logogram that is a homonym of the logogram input 120.

Figure 2A:
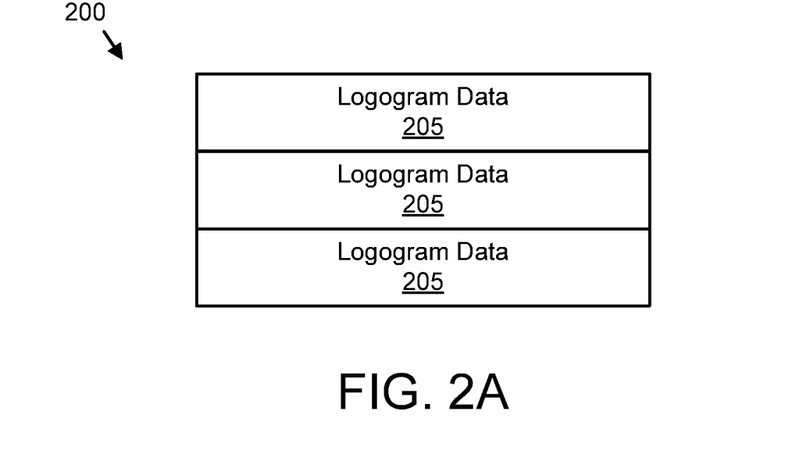
FIG. 2A is a schematic block diagram illustrating one embodiment of a logogram database.

FIG. 2A is a schematic block diagram illustrating one embodiment of a logogram database 200. The logogram database 200 may be organized as a data structure in a memory. The logogram database 200 may store logogram data 205 for a plurality of logograms.

Figure 2B:
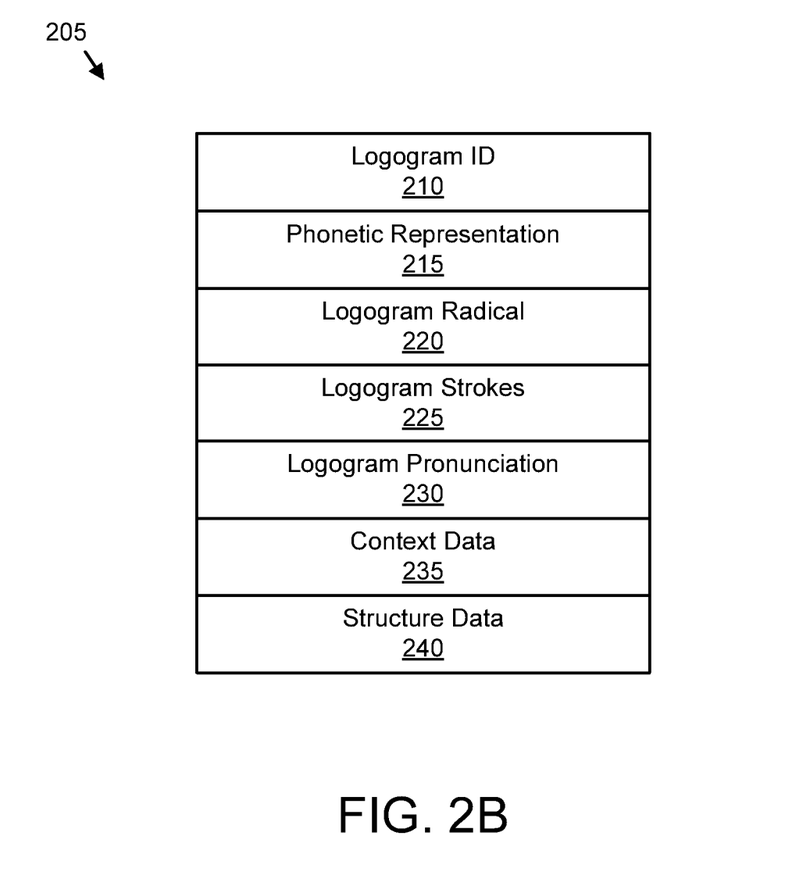
FIG. 2B is a schematic block diagram illustrating one embodiment of logogram data.

FIG. 2B is a schematic block diagram illustrating one embodiment of logogram data 205. The logogram data 205 may be organized as a data structure in the memory. The logogram data 205 may describe a given logogram. In the depicted embodiment, the logogram data 205 includes a logogram identifier 210, a phonetic representation 215, a logogram radical 220, logogram strokes 225, a logogram pronunciation 230, context data 235, and structure data 240.

The logogram identifier 210 may uniquely identify a logogram. In one embodiment, the logogram identifier 210 is the Unicode value for the logogram. The phonetic representation 215 may include a written phonetic representation. For example, the written phonetic representation for Chinese logograms may be pinyin. The logogram radical 220 may identify the radical of the logogram. The logogram radical 220 may include an index to a radical database. The logogram strokes 225 may describe one or more written strokes that render the logogram. The logogram pronunciation 230 may be recorded pronunciation of the logogram. The context data 235 may include common logograms that may surround the logogram, common sentence structures in which the logogram may be used, and/or other data that may identify the context in which the logogram is frequently used. Moreover, the structure data 240 may include a structure used to write the logogram. For example, the structure data 240 may identify the logogram as having one or more of a top-down structure, a top-middle-down structure, a left-right structure, and so forth.

Figure 3A:
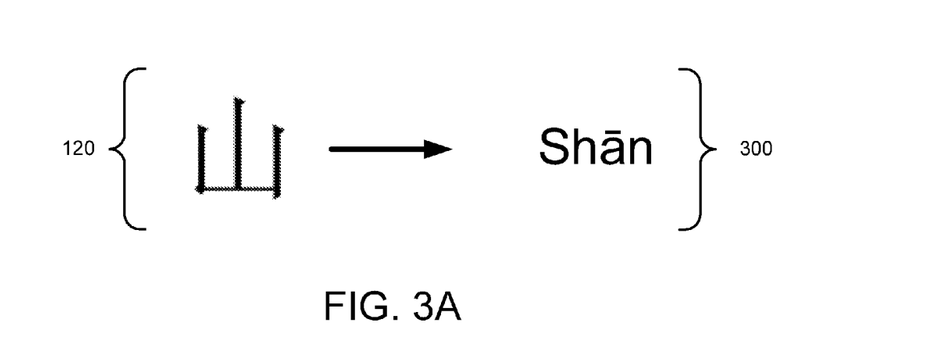
FIG. 3A is a drawing illustrating one embodiment of a first portion of determining homonyms of a logogram input.

FIG. 3A is a drawing illustrating one embodiment of a first portion of determining homonyms of the logogram input 120. In the depicted embodiment, the phonetic representation 215 of the incorrect logogram input 120 is determined. The phonetic representation 215 of the logogram input 120 may be determined by finding the logogram data 205 that corresponds to the logogram input 120 using the logogram database 200. As illustrated, the pinyin phonetic representation 215 of the logogram input 120 is shān 300.

Figure 3B:
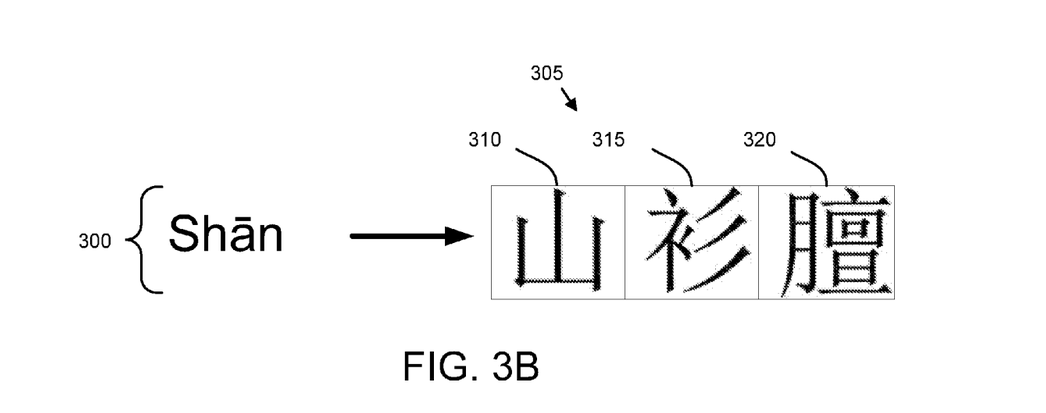
FIG. 3B is a drawing illustrating one embodiment of a second portion of determining homonyms of a logogram input.

FIG. 3B is a drawing illustrating one embodiment of a second portion of determining homonyms of the logogram input 120. In the depicted embodiment, homonyms 305 of shān 300 are determined. Specifically, the homonyms 305 include "山" 310 (mountain), "衫" 315 (shirt), and "羴" 320 (smell of mutton). The homonyms 305 may be determined in any suitable manner. For example, the homonyms 305 may be determined by searching the logogram database 200 for all logogram data 205 that includes the phonetic representation 215 of shān 300.

In some embodiments, the logogram database 200 may be organized with logograms grouped together based on their phonetic representation 215. Accordingly, in such embodiments, a group of logograms to which the logogram input 120 belongs may be the determined homonyms 305. For example, the database may be based on Chinese Guo Biao (GB) encoding in which logograms are grouped together based on their phonetic representation 215. Furthermore, in some embodiments, a lookup table may be used to find the homonyms 305.

Figure 3C:
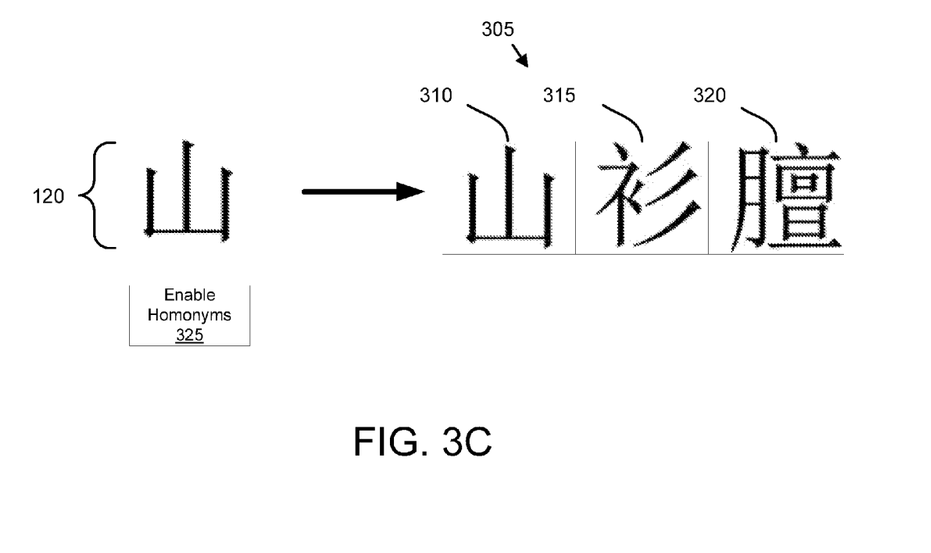
FIG. 3C is a drawing illustrating another embodiment of determining homonyms of a logogram input.

FIG. 3C is a drawing illustrating another embodiment of determining homonyms of the logogram input 120. The illustrated embodiment shows an enable homonyms 325 option that may be selected. The enable homonyms 325 option is used to determine whether homonyms of the logogram input 120 are to be made available to the user. If the enable homonyms 325 option is selected, the homonyms 305 of the logogram input 120 may be displayed after the logogram input 120 is recognized. The enable homonyms 325 option may be a button on the screen, a menu item, a mode, a voice command, a selectable option, and so forth. In certain embodiments, the enable homonyms 325 option may be selected before the logogram input 120 is drawn or typed, while in other embodiments, the enable homonyms 325 option may be selected after the logogram input 120 is drawn or typed.

Figure 4:
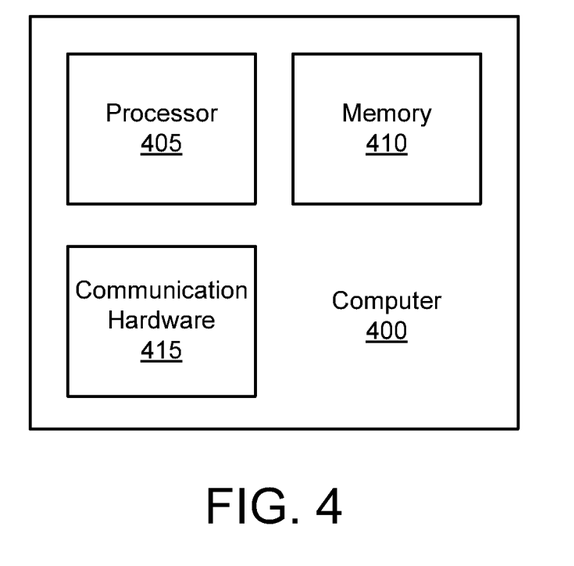
FIG. 4 is a schematic block diagram illustrating one embodiment of a computer.

FIG. 4 is a schematic block diagram illustrating one embodiment of a computer 400. The computer 400 may be embodied in the electronic device 100. Alternatively, the computer 400 may be embodied in a server in communication with the electronic device 400. In the depicted embodiment, the computer 400 includes a processor 405, a memory 410, and communication hardware 415. The memory 410 may be a semiconductor storage device, a hard disk drive, an optical storage device, a micromechanical storage device, or combinations thereof. The memory 410 may store code. The processor 405 may execute the code. The communication hardware 415 may communicate with other devices.

Figure 5:
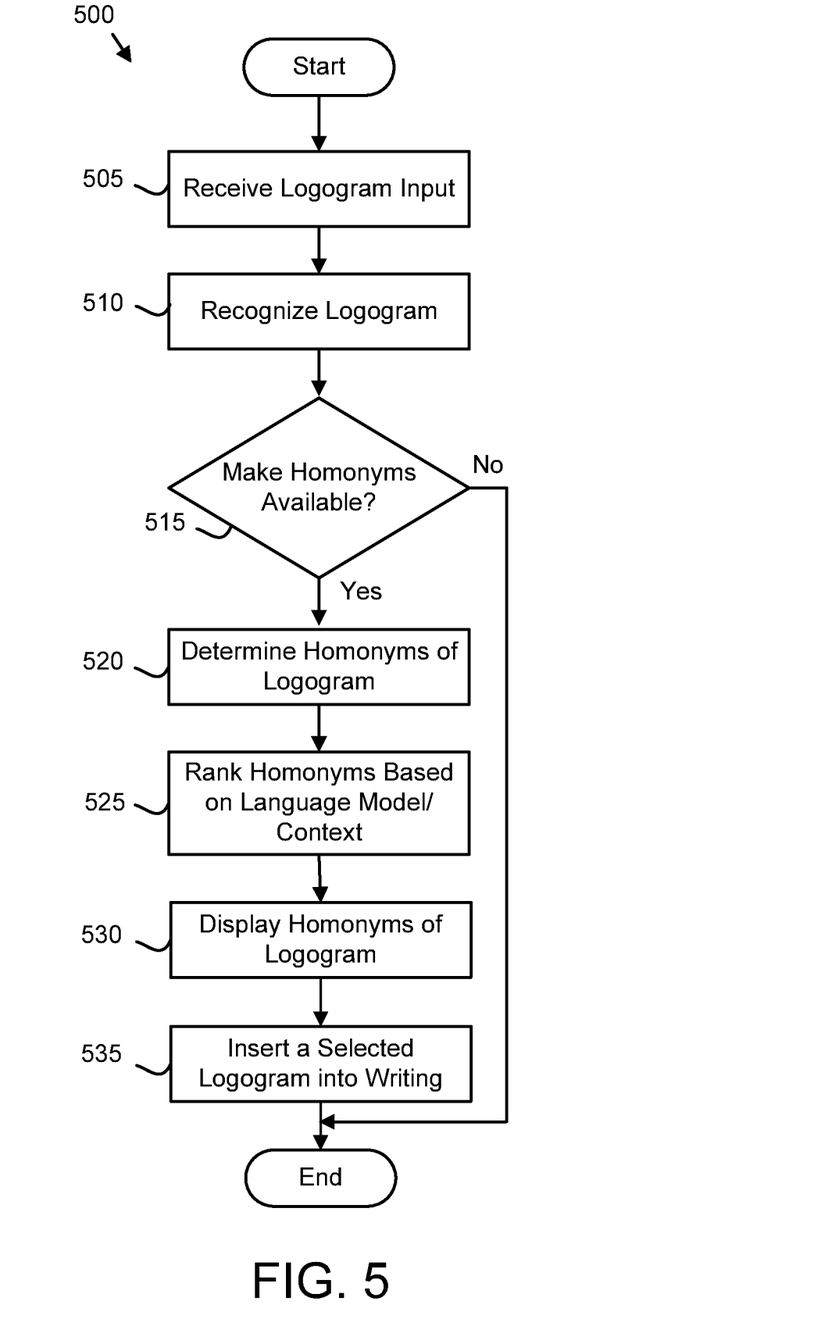
FIG. 5 is a schematic flow chart diagram illustrating one embodiment of a method that determines homonyms of logogram input.

FIG. 5 is a schematic flow chart diagram illustrating one embodiment of a method 500 that determines homonyms of the logogram input 120. The method 500 may be performed by the processor 405. Alternatively, the method 500 may be performed by computer readable storage medium such as the memory 410. The computer readable storage medium may store code that is executable by the processor 405 to perform the functions of the method 500.

The method 500 starts, and in one embodiment, the code receives 505 the logogram input 120 from at least part of a written logogram drawn or typed by the user. The logogram input 120 may be accepted by the graphical input 105 of the electronic device 100. The code may further generate the logogram data 205 from the logogram input 120. Moreover, the code may generate the logogram stroke data 225 from the logogram input 120. The code may further recognize 510 the logogram from the logogram input 120 and/or the logogram data 205. In certain embodiments, the logogram may be recognized 510 from only part of the written logogram drawn by the user.

The code further may determine 515 whether homonyms of the logogram input 120 are to be made available to the user. In certain embodiments, the determination 515 may be made based on whether the enable homonyms 325 option is selected. If the determination 515 is that homonyms of the logogram input 120 are not to be made available to the user, then the method 500 ends.

However, if the determination 515 is that homonyms of the logogram input 120 are to be made available to the user, then the code may further determine 520 multiple logograms having a pronunciation that matches the pronunciation of the logogram input 120 (e.g., homonyms of the logogram input 120). In some embodiments, the code that determines 520 multiple logograms having the pronunciation that matches the pronunciation of the logogram input 120 may include code that selects the multiple logograms from the logogram database 200 in which logograms are grouped together in subsets based on pronunciation (e.g., Chinese GB encoding). Such embodiments may include code that matches the logogram input 120 with a substantially equal logogram within one of the subsets and selects all logograms within the one of the subsets as the multiple logograms. It should be noted that a substantially equal logogram may be a logogram that has the same pronunciation including tone as the logogram input 120. Alternatively, a substantially equal logogram may be a logogram that has the same pronunciation but not the same tone as the logogram input 120.

The code may further rank 525 the multiple logograms (e.g., homonyms) based on a likelihood of matching an intended logogram to be used by the user. The ranking 525 may order the multiple logograms from most to least likely to be the intended logogram, from least to most likely to be the intended logogram, or using any other suitable ordering. In certain embodiments, the ranking 525 may include ranking 525 the multiple logograms based on one or more of a context in which each logogram is to be used, a structure of each logogram, and a number of strokes of each logogram. For example, the multiple logograms may be ranked 525 based on the context data 235 of how each logogram would fit into the sentence structure of logograms around the logogram input 120. In another example, the multiple logograms may be ranked 525 based on a complexity of the structure data 240 corresponding to each logogram. In some embodiments, more complex structures, such as top-middle-down structures, may be ranked higher than less complex structures, such as left-right and/or top-down structures. However, in other embodiments, more complex structures may be ranked lower than less complex structures.

The code may display 530 the multiple logograms that have the same pronunciation of the logogram input 120. For example, the code may transmit the multiple logograms to the display 110 (e.g., display device) to enable selection of one of the multiple logograms by the user. The code may further insert 535 a logogram selected by the user into a writing and the method 500 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a memory that stores code executable by the processor, the code comprising:
   code that recognizes a logogram from at least part of a written logogram drawn by a user or a typed logogram;
   code that determines whether homonyms of the logogram are to be made available to the user;
   code that determines a plurality of logograms having a pronunciation that matches the pronunciation of the logogram if the homonyms of the logogram are to be made available to the user; and
   code that displays the plurality of logograms on a display device to enable selection of one of the plurality of logograms by the user in response to the user drawing the written logogram or inputting the typed logogram.

2. The apparatus of claim 1, wherein the code further comprises code that transmits the plurality of logograms to the display device.

3. The apparatus of claim 2, wherein the code further comprises code that inserts the one of the plurality of logograms selected by the user into a writing.

4. The apparatus of claim 1, wherein the code further comprises code that ranks the plurality of logograms based on a likelihood of matching an intended logogram to be used by the user.

5. The apparatus of claim 4, wherein the code that ranks the plurality of logograms further comprises code that ranks the plurality of logograms based on one or more of a context in which each logogram of the plurality of logograms is to be used, a structure of each logogram of the plurality of logograms, and a number of strokes of each logogram of the plurality of logograms.

6. The apparatus of claim 1, wherein the code that determines the plurality of logograms having the pronunciation that matches the pronunciation of the logogram further comprises code that selects the plurality of logograms from a data set in which logograms are grouped together in subsets based on pronunciation.

7. The apparatus of claim 6, wherein the code that selects the plurality of logograms from the dataset further comprises code that matches the logogram with a substantially equal logogram within one of the subsets and selects all logograms within the one of the subsets as the plurality of logograms.

8. A method comprising:
   recognizing, by use of a processor, a logogram from at least part of a written logogram drawn by a user or a typed logogram;
   determining whether homonyms of the logogram are to be made available to the user;
   determining a plurality of logograms having a pronunciation that matches the pronunciation of the logogram if the homonyms of the logogram are to be made available to the user; and
   displaying the plurality of logograms on a display device to enable selection of one of the plurality of logograms by the user in response to the user drawing the written logogram or inputting the typed logogram.

9. The method of claim 8, further comprising transmitting the plurality of logograms to the display device to enable selection of one of the plurality of logograms by the user.

10. The method of claim 9, further comprising inserting the one of the plurality of logograms selected by the user into a writing.

11. The method of claim 8, further comprising ranking the plurality of logograms based on a likelihood of matching an intended logogram to be used by the user.

12. The method of claim 11, wherein ranking the plurality of logograms further comprises ranking the plurality of logograms based on one or more of a context in which each logogram of the plurality of logograms is to be used, a structure of each logogram of the plurality of logograms, and a number of strokes of each logogram of the plurality of logograms.

13. The method of claim 12, wherein the structure comprises one or more of a top-down structure, a top-middle-down structure, and a left-right structure.

14. The method of claim 8, wherein determining the plurality of logograms having the pronunciation that matches the pronunciation of the logogram further comprises selecting the plurality of logograms from a data set in which logograms are grouped together in subsets based on pronunciation.

15. The method of claim 14, wherein selecting the plurality of logograms from the dataset further comprises matching the logogram with a substantially equal logogram within one of the subsets and selecting all logograms within the one of the subsets as the plurality of logograms.

16. A program product comprising a non-transitory computer readable storage medium that stores code executable by a processor, the executable code comprising code to perform:

recognizing a logogram from at least part of a written logogram drawn by a user or a typed logogram;

determining whether homonyms of the logogram are to be made available to the user;

determining a plurality of logograms having a pronunciation that matches the pronunciation of the logogram if the homonyms of the logogram are to be made available to the user; and displaying the plurality of logograms on a display device to enable selection of one of the plurality of logograms by the user in response to the user drawing the written logogram or inputting the typed logogram.

17. The program product of claim 16, wherein the code further performs transmitting the plurality of logograms to the display device.

18. The program product of claim 16, wherein the code further performs ranking the plurality of logograms based on one or more of a context in which each logogram of the plurality of logograms is to be used, a structure of each logogram of the plurality of logograms, and a number of strokes of each logogram of the plurality of logograms.

19. The program product of claim 16, wherein the code that performs determining the plurality of logograms having the pronunciation that matches the pronunciation of the logogram further performs selecting the plurality of logograms from a data set in which logograms are grouped together in subsets based on pronunciation.

20. The program product of claim 19, wherein the code that performs selecting the plurality of logograms from the dataset further performs matching the logogram with a substantially equal logogram within one of the subsets and selecting all logograms within the one of the subsets as the plurality of logograms.

* * * * *